United States Patent
Rawls et al.

(10) Patent No.: US 10,816,267 B2
(45) Date of Patent: Oct. 27, 2020

(54) SMART SLIDE

(71) Applicant: O.I. Corporation, College Station, TX (US)

(72) Inventors: Nathan C. Rawls, Somerville, TX (US); Noel C. Bauman, College Station, TX (US); Richard K. Simon, College Station, TX (US)

(73) Assignee: O.I. CORPORATION, College Station, TX (US)

( * ) Notice: Subject to any disclaimer, the term of this patent is extended or adjusted under 35 U.S.C. 154(b) by 210 days.

(21) Appl. No.: 15/807,159

(22) Filed: Nov. 8, 2017

(65) Prior Publication Data

US 2018/0128547 A1    May 10, 2018

Related U.S. Application Data (60) Provisional application No. 62/418,929, filed on Nov. 8, 2016.

(51) Int. Cl.
  *F27D 1/18*    (2006.01)
  *F16K 3/18*    (2006.01)
  (Continued)

(52) U.S. Cl.
  CPC .............. *F27D 1/18* (2013.01); *F16K 3/0227* (2013.01); *F16K 3/0254* (2013.01); *F16K 3/186* (2013.01);
  (Continued)

(58) Field of Classification Search
  CPC ...... F16K 3/0227; F16K 3/0254; F16K 3/186; F27D 1/18; F27D 99/0073; F27D 2099/0078; F27D 2099/008; F27B 17/02
  (Continued)

(56) References Cited

U.S. PATENT DOCUMENTS

| 3,672,841 A | 6/1972 | Freeman, Jr. et al. |
| 4,043,787 A | 8/1977 | Foster |

(Continued)

FOREIGN PATENT DOCUMENTS

| EP | 1762759 A2 | 3/2007 |
| FR | 2563886 A * | 11/1985 |
| WO | 9113278 A1 | 9/1991 |

OTHER PUBLICATIONS

English language Abstract of EP1762759A2.
English language publication of EP1762759A2.

*Primary Examiner* — Steven B McAllister
*Assistant Examiner* — Benjamin W Johnson
(74) *Attorney, Agent, or Firm* — Ware, Fressola, Maguire & Barber LLP (57) ABSTRACT

A furnace system has a furnace-tube-cap (FTC) and a slider. The FTC has a first-cap-portion coupled to a furnace tube of a furnace, a second-cap-portion with a bearing-assembly-arrangement (BAA), and an inner-tube-cap-channel (ITCC) passing from the first-to-second cap portion with an ITCC sealing arrangement extending outside the ITCC. The slider slides in the BAA to/from inject-and-rinse positions, and has a first-ramp (FR), a first-raised-surface (FRS), an intermediate-lower-surface (ILS), a second-ramp (SR), and a second-raised-surface (SRS). When the slider moves to the inject-or-rinse positions, the BAA forces a slider-part to push against an inner-channel-sealing-arrangement (ICSA) as the BAA goes from the FR-to-FRS, or the SR-to-SRS. When the slider is in the inject-or-rinse position, a first-slider-part seals the ITCC sealing arrangement. When the slider transitions between the inject-and-rinse positions and the BAA rides along the ILS, the BAA allows the slider-part to float above the ICSA arrangement.

13 Claims, 9 Drawing Sheets

Inject position, sealing O-rings under pressure

Prime position, sealing O-rings under pressure, where during transition, pressure on O-rings relieved (51) Int. Cl.
*F16K 3/02* (2006.01)
*F27D 99/00* (2010.01)
*F27B 17/02* (2006.01)

(52) U.S. Cl.
CPC .......... *F27B 17/02* (2013.01); *F27D 99/0073* (2013.01); *F27D 2099/008* (2013.01); *F27D 2099/0078* (2013.01)

(58) Field of Classification Search
USPC ........................................................ 432/242
See application file for complete search history.

(56) References Cited

U.S. PATENT DOCUMENTS

| | | |
|---|---|---|
| 4,065,286 A | 12/1977 | Becker |
| 4,283,218 A | 8/1981 | Staley |
| 4,817,915 A | 4/1989 | Tinner |
| 4,968,485 A | 11/1990 | Morita |
| 5,411,564 A | 5/1995 | Bolin |
| 5,868,813 A | 2/1999 | Mann et al. |
| 5,964,914 A | 10/1999 | Stenholm et al. |
| 6,085,552 A | 7/2000 | Voisine et al. |
| 6,170,294 B1 | 1/2001 | Mann et al. |
| 6,235,242 B1 | 5/2001 | Small et al. |
| 9,120,692 B2 | 9/2015 | Kuz et al. |
| 2003/0101690 A1* | 6/2003 | Deegan ................ B65B 31/025 53/432 |
| 2007/0057220 A1 | 3/2007 | Bosch |
| 2010/0116239 A1 | 5/2010 | Crall |
| 2012/0135096 A1 | 5/2012 | Maeyama et al. |
| 2012/0313023 A1* | 12/2012 | Brock .................... F16K 3/186 251/197 |
| 2016/0245412 A1 | 8/2016 | Yang |

\* cited by examiner

FIG. 2A: Smart slide in Inject position

FIG. 2B

FIG. 3A: Inject position, sealing O-rings under pressure

FIG. 3B: Prime position, sealing O-rings under pressure, where during transition, pressure on O-rings relieved

*FIG. 4*: Inject position, where bearings force slide against O-rings to form seal

FIG. 5A

Seal broken, fiction reduced

FIG. 5B

FIG. 5: In transition, where ramps & bearings allow slide to float above O-ring reducing friction/wear on O-ring

FIG. 6: Prime position, where bearings force against O-ring to form seal

FIG. 7A

FIG. 7B: Inject position, slide pushed against O-ring seal

FIG. 7C: Transition position, slide lifted above O-ring seal

FIG. 7D: Prime position, slide once again pushed against O-ring seal

FIG. 7: Alternate slider/furnace cap design, where slide is actually lifted off of O-ring seal by cam follower bearings in cam pathway and not just allowed to "float" as in the "ramped" version

FIG. 8A

FIG. 8B: Inject position, slide pushed against O-ring seal

FIG. 8C: Transition position, slide lifted above O-ring seal

FIG. 8D: Prime position, slide once again pushed against O-ring seal

FIG. 8: Alternate slider/furnace cap design, having two (2) cam followers, where slide is actually lifted off of O-ring seal by cam follower bearings in cam pathway and not just allowed to "float" as in the "ramped" version (see and compare Figs. 4A, 4B; 5A, 5B; and 6A, 6B)

SMART SLIDE

CROSS-REFERENCE TO RELATED APPLICATIONS

This application claims benefit to provisional patent application Ser. No. 62/418,929, filed 8 Nov. 2016, which is incorporated by reference in its entirety.

BACKGROUND OF THE INVENTION

1. Field of Invention

This invention relates to a Total Organic Carbon (TOC) system for measuring organic contaminants in a water system; and more particularly relates to a slide tube in such a TOC system that is moved between inject and rinse positions.

2. Description of Related Art

The sliding O-ring seal used in present technology wears and leaks within a month (6500 cycles) due to the constant friction applied to the Teflon® O-ring as the slider moves across the O-ring. This constant friction causes the slider to shear the top face of the O-ring, resulting in Teflon® material being removed from the O-ring. Ultimately, enough material is worn away that the spring force (provide by a second O-ring, typically made of Viton®) is unable to maintain an air-tight seal of the Teflon® sealing O-ring against the slide in the "inject" and "rinse" positions. NOTE: an air-tight seal is NOT required while the slide is moving between these two positions. Alternatively, an elastomeric seal such as Viton® could be employed instead of the Teflon® but the Teflon® is more inert and self lubricating.

In view of this, there is a need in the art for a better sliding O-ring seal.

SUMMARY OF THE INVENTION

In summary, the present invention provides a new "ramp" feature in the slide design that allows the slider to move away from the O-ring as it transitions from the "inject" to "rinse" position. This "ramping" action significantly "unloads" the force on the O-ring seal as the slider transitions, greatly reducing the wear on the O-ring seal.

Initial testing of this new ramp-based design has shown to increase the O-ring lifetime a factor of 15-20 times over the previous one-month service life.

Another alternate version may include the ability to lift and place the injector between the Inject and Waste positions, via a cam or other mechanism. This would likely provide the maximum O-ring life, but at the expense of cost and complexity and a significant loss of sealing while moving.

The known sliding style injector has no ramp features which is the primary advantage of the invention disclosed and designed herein to increase the usable life of the O-ring. Other differences include: the known sliding style injector uses material that is Kel-F vs PEEK for design disclosed herein, and the known sliding style injector has O-rings that are metric vs SAE for design disclosed herein.

Specific Embodiments

According to some embodiments, the present invention may include, or take the form of, a sliding style furnace cap, featuring a furnace tube cap in combination with a slider.

The furnace tube cap has a first cap portion configured to couple to a furnace tube of a furnace, and has a second cap portion with a bearing assembly arrangement. The furnace tube cap also has an inner tube cap channel passing from the first cap portion to the second cap portion with an inner tube cap channel sealing arrangement configured to extend outside the inner tube cap channel.

The slider has an orifice/channel configured therein passing through the slider, may be configured to couple and slide in the bearing assembly arrangement from an inject position to a rinse position, and vice versa, and has a cam-like contoured surface with a first ramp configured to couple a first raised surface and an intermediate lower surface, and with a second ramp configured to couple the intermediate lower surface to a second raised surface.

The slider may be configured to move towards the inner tube cap channel and cause the bearing assembly arrangement to force a part/side of the slider to push against the inner channel sealing arrangement as part of the roller bearing assembly rides up either the first ramp to the first raised portion when the slider is moved to the inject position, or the second ramp to the second raised portion when the slider is moved to the rinse position. The first side of slider may be configured to seal the inner tube cap channel sealing arrangement when the slider is in either the inject position or the rinse position.

The slider may also be configured to move away from the inner tube cap channel and cause the bearing assembly arrangement to allow the part/side of the slider to float above the inner channel sealing arrangement as the part of the roller bearing assembly rides along the intermediate lower surface when the slider is in transition between the inject position and the rinse position.

The system may include one or more of the following additional features:

The inner channel sealing arrangement may include an O-ring combination, including an inner elastomeric seal with an inner O-ring made of Viton® and an outer inert and self-lubricating O-ring made of Teflon®.

The cam-like contoured surface may include:
the first ramp configured to couple the first raised surface and a first intermediate lower surface,
the second ramp configured to couple the first intermediate lower surface to the second raised surface,
a third ramp configured to couple the second raised surface to a second intermediate lower surface, and
a fourth ramp configured to couple the second intermediate lower surface to a third raised surface.

The bearing assembly arrangement may include two sets of bearing assemblies, one arranged over the first raised surface in the inject position, and the other arranged over the second raised surface in the rinse position.

The slider may include a cam pathway having upper and lower cam-like contoured surfaces corresponding to one another; and the bearing assembly arrangement takes the form of a bearing cam follower.

The slider may include two corresponding cam pathway, each cam pathway having the upper and lower cam-like contoured surfaces corresponding to one another; and the bearing assembly arrangement may include two corresponding bearing cam followers.

This present invention may also take the form of a Total Organic Carbon (TOC) system for measuring organic contaminants in a water system, e.g., having such a sliding style furnace cap.

BRIEF DESCRIPTION OF THE DRAWING

The drawing, which are not necessarily drawn to scale, includes FIGS. 1-8, as follows:

FIG. 1 includes FIGS. 1A and 1B, where

FIG. 4 includes FIGS. 4A and 4B, e.g., showing the smart slide in the inject position, where bearings force the slider against the O-rings to form a seal between a first part of the slider and the O-rings, where

FIG. 5 includes FIGS. 5A and 5B, e.g., showing the smart slide in transition from the inject position to the prime position, such that ramps and bearings allow the slider to float above the O-rings reducing friction/wear on the O-rings, and when the seal (FIG. 4B) is broken, friction is reduced, where

FIG. 6 includes FIGS. 6A and 6B, e.g., showing the smart slide in the prime position, where bearings force the slider against the O-rings to form a seal between a second part of the slider and the O-rings, where

FIG. 7 includes FIGS. 7A thru 7D that show an alternate slider/furnace cap design, e.g., such that a slider is actually lifted off of the O-ring seal by cam follower bearings in a cam pathway and not just allowed to "float" as in the "ramped" version (e.g., see and compare FIGS. 4A, 4B; 5A, 5B; and 6A, 6B), where

FIG. 8 includes FIGS. 8A thru 8D that show an alternate slider/furnace cap design having two (2) cam followers, e.g., such that the slider is actually lifted off of the O-ring seal by cam follower bearings in a cam pathway and not just allowed to "float" as in the "ramped" version (e.g., see and compare FIGS. 4A, 4B; 5A, 5B; and 6A, 6B), where

To reduce clutter in the drawing, each Figure in the drawing does not necessarily include every reference label for every element shown therein.

DETAILED DESCRIPTION OF BEST MODE OF THE INVENTION

Figure 1A:
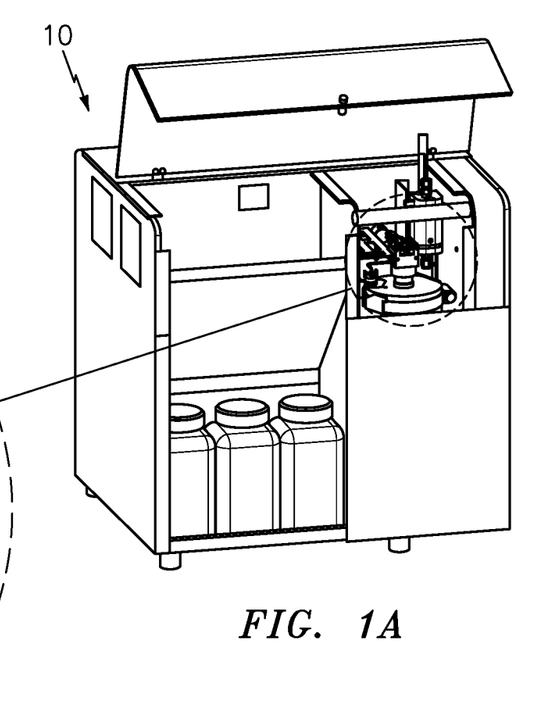
FIG. 1A shows a perspective view of a furnace system including a furnace having a smart slide arranged therein, and where
Figure 1B:
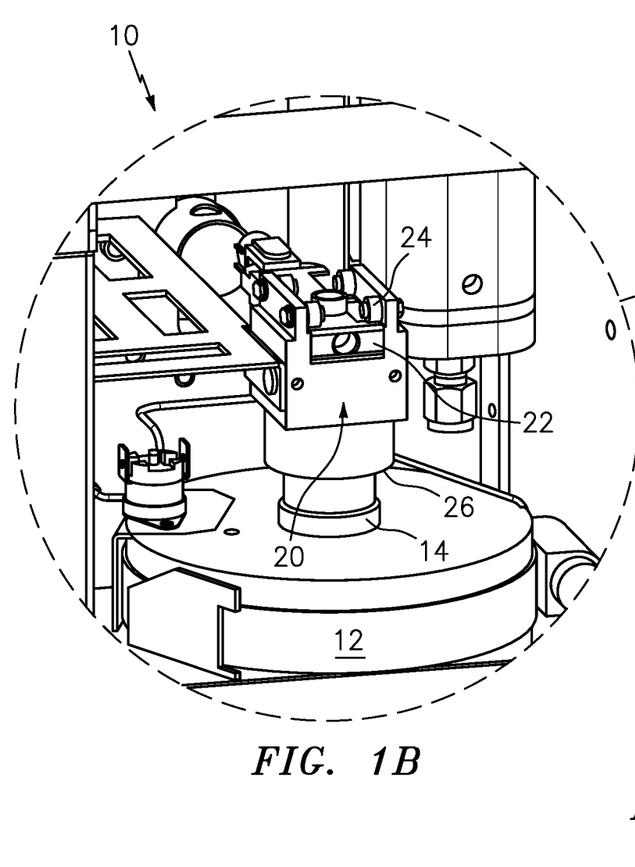
FIG. 1B shows an exploded view of part of the furnace system in FIG. 1A, e.g., showing the smart slide, all according to some embodiments of the present invention.

FIG. 1

FIG. 1A shows a furnace system generally indicated as 10 having a furnace 12 with a smart slide or sliding style furnace cap 20 arranged therein, according to some embodiments of the present invention. The furnace 12 includes a furnace tube 14. The smart slide 20 includes a slide or slider 22, a roller bearing arrangement 24 having roller bearings 24a (FIG. 2A), and a furnace cap or furnace tube cap portion 26 configured to couple the smart slide 20 to the furnace tube 14. The furnace system 10 may include, or take the form of, a Total Organic Carbon system for measuring organic contaminants in a water system, e.g., according to the present invention.

FIGS. 2A, 2B, 3A, 3B

Figure 2A:
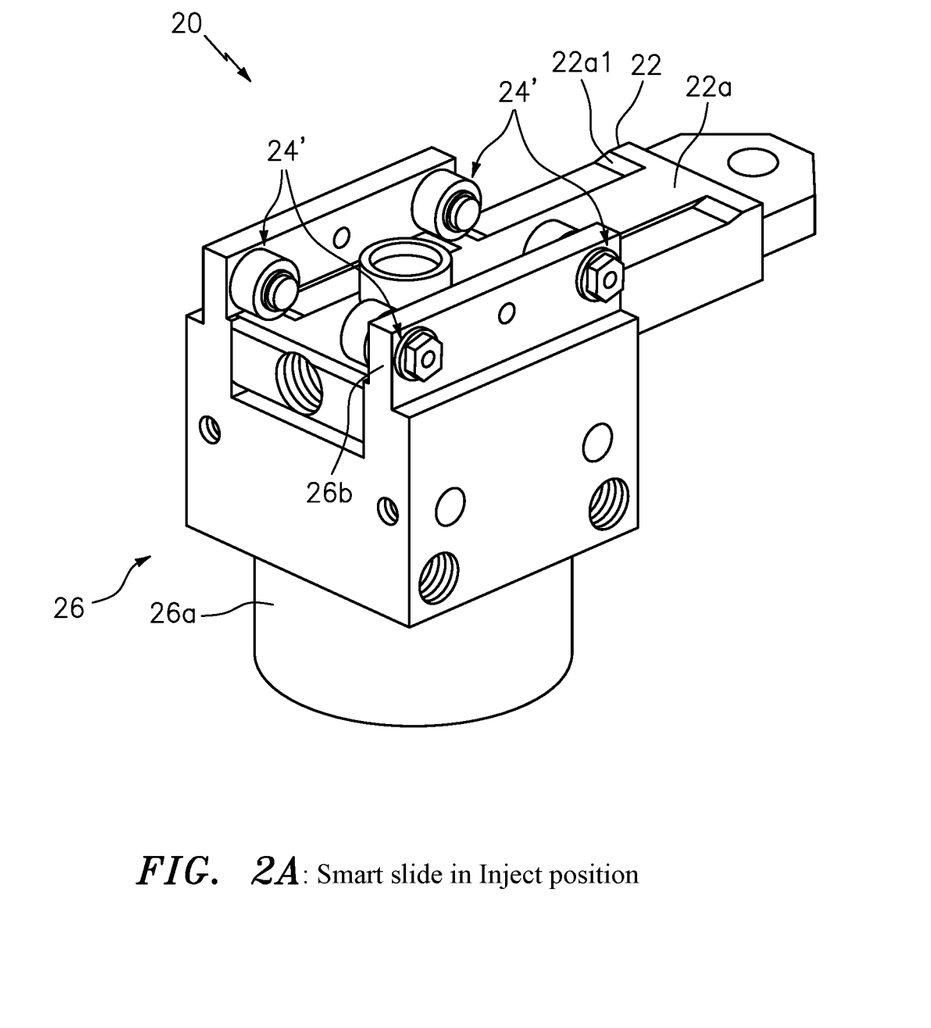
FIG. 2A shows a perspective view of the smart slide in the inject position.
Figure 2B:
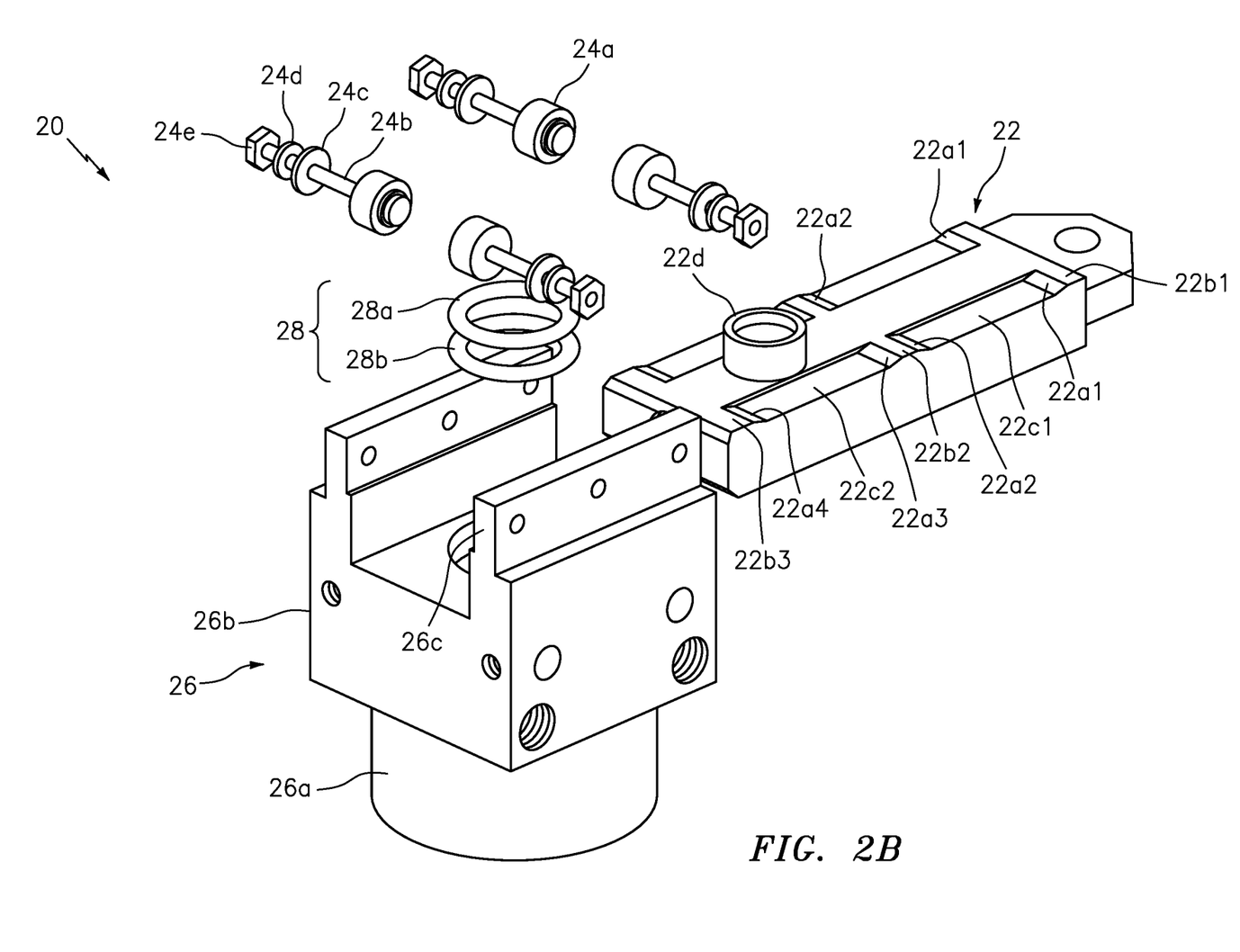
FIG. 2B shows a corresponding exploded perspective view of the smart slide in FIG. 2A, according to some embodiments of the present invention.

FIGS. 2A and 2B shows the smart slide 20 in the inject position. The smart slide 20 includes the following:

The furnace cap portion 26 has a first cap portion 26a configured to couple to the furnace tube 14 of the furnace 12, and has a second cap portion 26b with the bearing assembly arrangement 24 configured or arranged thereon as shown. The furnace tube cap 26 also has an inner tube cap channel 26c configured or formed therein, e.g., passing from the first cap portion 26a to the second cap portion 26b with an inner tube cap channel sealing arrangement generally indicated as 28 configured to extend outside the inner tube cap channel 26c. By way of example, the inner tube cap channel sealing arrangement 28 includes O-rings 28a, 28b, which may be made of rubber or Viton.

By way of example, the roller rearing arrangement 24 includes four roller bearing subassemblies 24', e.g., each having a roller bearing, one of which is labeled 24a, a bolt, one of which is labeled 24b, a washer, one of which is labeled 24c, a split lock washer, one of which is labeled 24d, and a hex nut, one of which is labeled 24e. This arrangement/configuration is set forth by way of example, and the scope of the invention is intended to include other types or kind of arrangements or configurations within the spirit of the present invention, e.g., see FIGS. 7 and 8 below.

Each roller bearing assembly 24' may be configured or arranged in a respective aperture/orifice, one of which is labeled O, in the second cap portion 26b.

FIGS. 2A and 2B also show the slider 22 having a cam-like contoured surface 22a with friction relieving ramps 22a1, 22a2, 22a3, 22a4 that respectively couple raised surfaces 22b1, 22b2, 22b3 and intermediate lower surfaces 22c1, 22c2, the function of which will all be described in greater detail below in related to FIGS. 4-6. The slider 22 has an orifice/channel 22d configured or formed therein, e.g., passing from one side to the other side and through the slider 22. The cam-like contoured surface 22a is configured to couple and slide in the bearing assembly arrangement 24 from an inject position (e.g., see FIGS. 2A and 4) to a rinse position (e.g., see FIG. 6), and vice versa. In particular, the first ramp 22a1 is configured to couple the first raised surface 22b1 and the first intermediate lower surface 22c1, and the second ramp 22a2 is configured to couple the intermediate lower surface 22c1 to the second raised surface 22b2. Similarly, the third ramp 22b3 is configured to couple the second raised surface 22b2 and the second intermediate lower surface 22c2, and the fourth ramp 22a4 is configured to couple the second intermediate lower surface 22c2 to the third raised surface 22b3, e.g., consistent with that shown in FIGS. 2A and 2B.

Figure 3A:
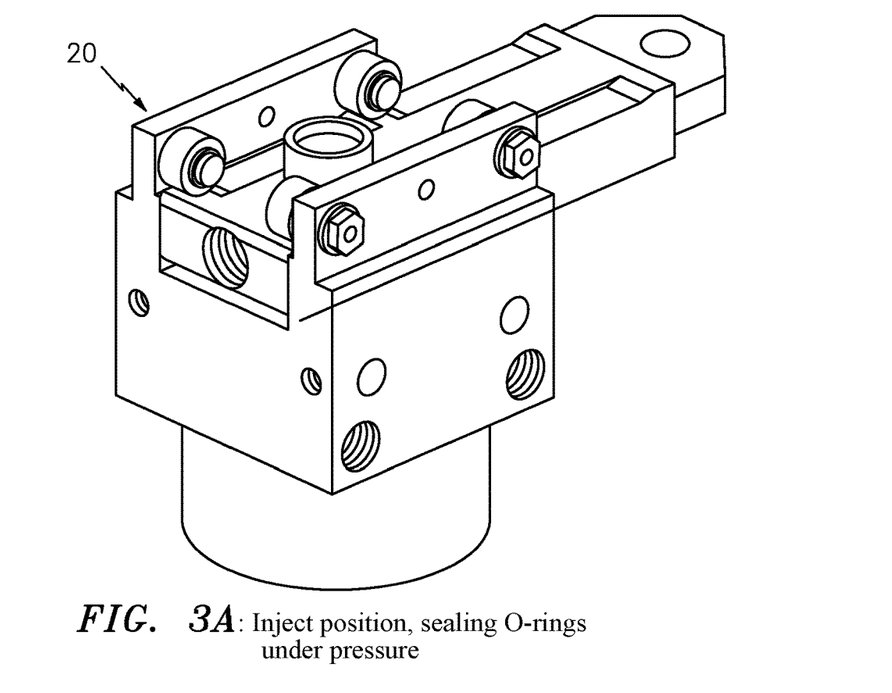
FIG. 3A shows a perspective view of the smart slide of FIG. 2A in the inject position, e.g., having sealing O-rings under pressure; in contrast
Figure 3B:
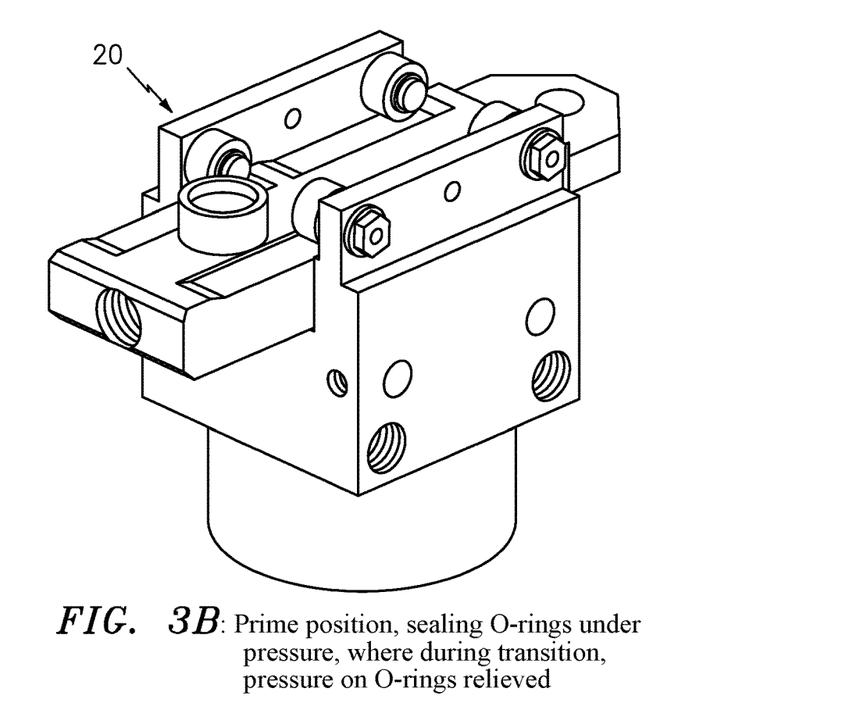
FIG. 3B shows a corresponding perspective view of the smart slide of FIG. 2A in the prime position, e.g., having sealing O-rings under pressure, where during the transition between the inject and prime positions, pressure on the O-rings is relieved, according to some embodiments of the present invention.

FIG. 3A shows the smart slide 20 of FIG. 2A in the inject position, e.g., having sealing O-rings under pressure. In contrast, FIG. 3B shows the smart slide 20 of FIG. 2A in the prime/rinse position, e.g., having sealing O-rings also under pressure, where during the transition between the inject and prime positions, pressure on the O-rings is relieved, e.g., by the cooperation between the cam-like contoured surface 22a and the bearing arrangement 24, according to some embodiments of the present invention.

FIG. 4

Figure 4A:
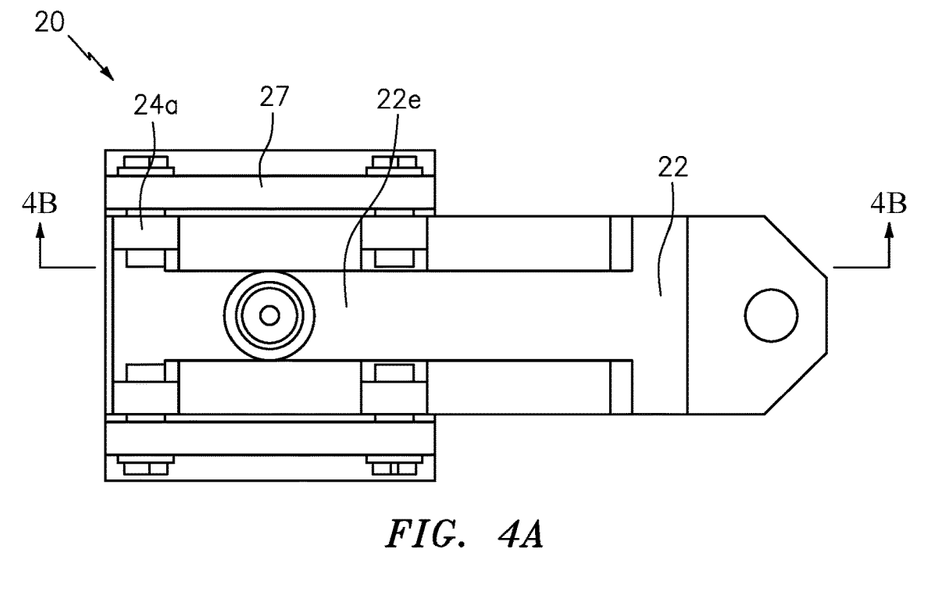
FIG. 4A shows a top down view of the smart slide, and where
Figure 4B:
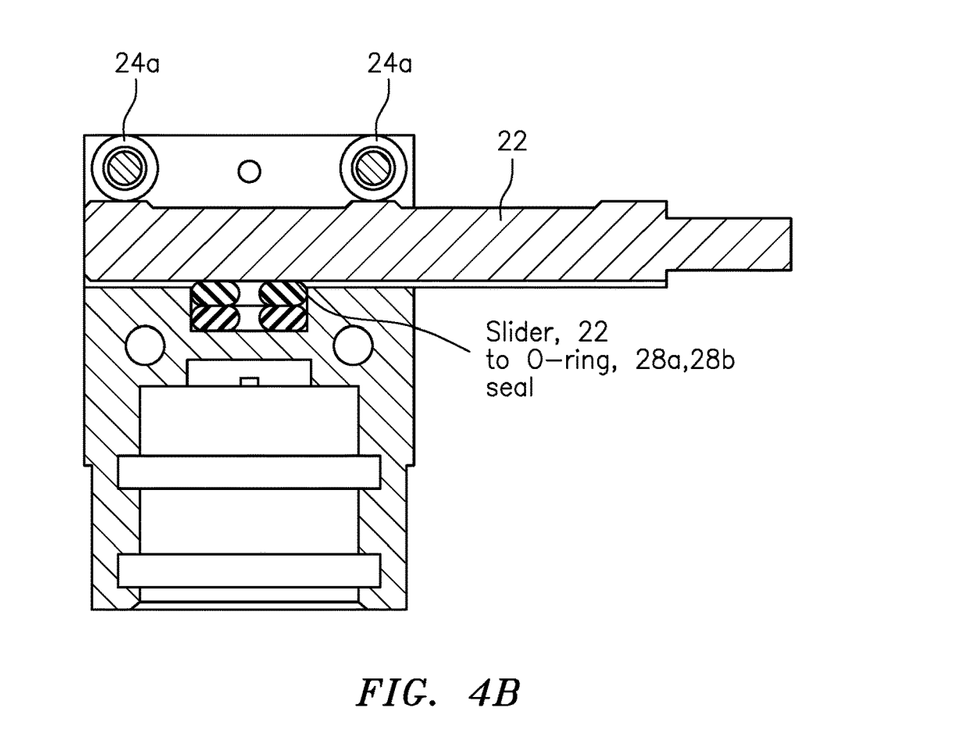
FIG. 4B shows a cross-sectional view of the smart slide in FIG. 4A along section lines A-A.

FIG. 4 includes FIGS. 4A and 4B, e.g., showing the smart slide 20 in the inject position, where the bearings 24a force the slider 22 against the O-rings 28a, 28b to form a seal between a first part 22e of the slider 22 and the O-rings 28a, 28b.

In operation, the slider 22 is configured to move towards the inner tube cap channel 26c and cause the bearing assembly arrangement 24 to force the first part 22e of the slider 22 to push against the inner channel sealing arrangement 28 as the roller bearings 24a on the other side of the slider 22 ride up the ramps 22a2, 22a4, to the raised portions 22b3, 22b4 when the slider 22 is moved to the inject position, e.g., consistent with that shown in FIGS. 2A and 2B. The first part 22e of the slider 22 is configured to seal the inner tube cap channel sealing arrangement 28 when the slider 22 is in the inject position (see FIG. 4), e.g., consistent with that shown in FIG. 4.

FIG. 5

Figure 5A:
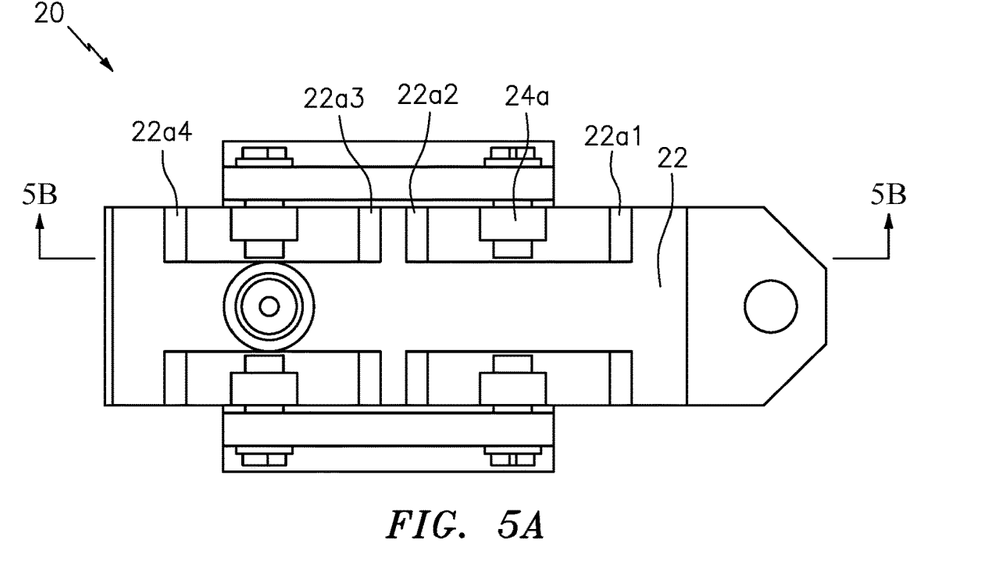
FIG. 5A shows a top down view of the smart slide, and where
Figure 5B:
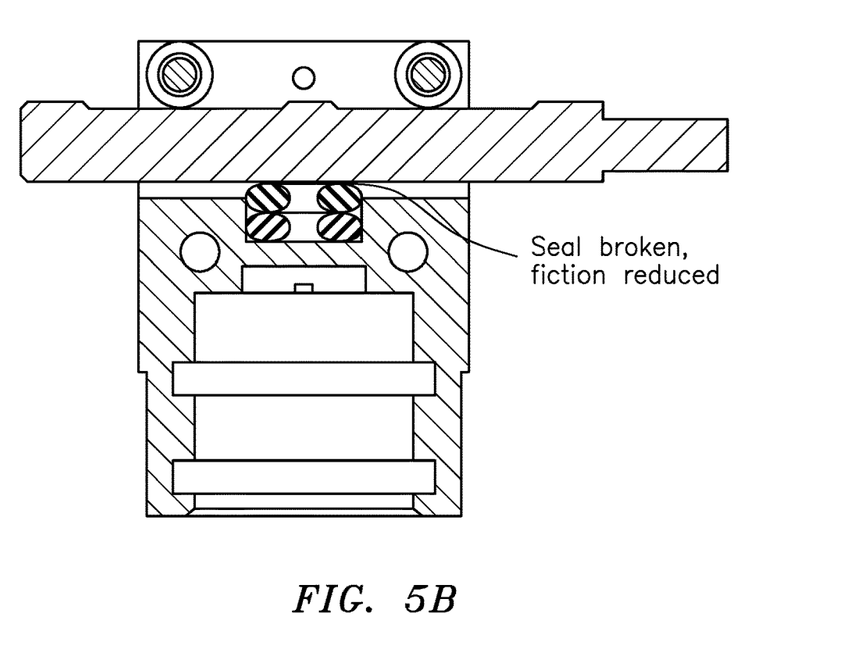
FIG. 5B shows a cross-sectional view of the smart slide in FIG. 4A along section lines B-B.

FIG. 5 includes FIGS. 5A and 5B, e.g., showing the smart slide 20 in transition from the inject position to the prime/rinse position, such that the friction relieving ramps 22a1, 22a2, 22a3, 22a4 and bearings 24a allow the slider 22 to float above the O-rings 28a, 28b reducing friction/wear on the O-rings 28a, 28b, so when the seal is broken (see and compare FIG. 4B), friction is reduced.

In operation, the slider 22 is configured to move away from the inner tube cap channel 26c and the inject position and cause the bearing assembly arrangement 24 to allow the first part 22e of the slider 22 to float above the inner channel sealing arrangement 26c as the roller bearings 24a ride along the intermediate lower surfaces 22c1, 22c2 when the slider 22 is in transition between the inject position (FIG. 4) and the rinse position (FIG. 6), e.g., consistent with that shown in FIGS. 4-6.

FIG. 6

Figure 6A:
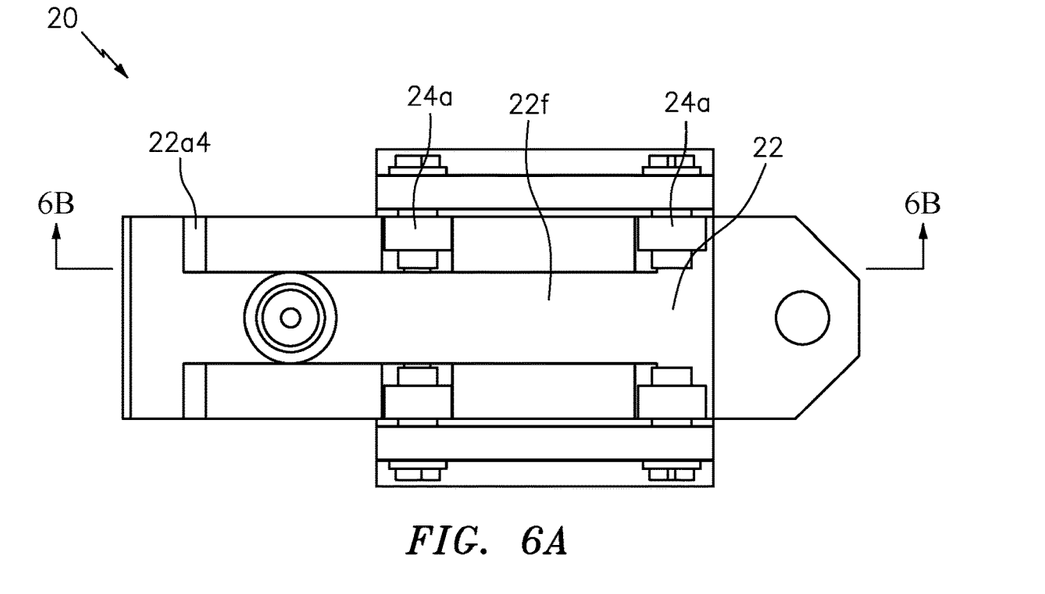
FIG. 6A shows a top down view of the smart slide, and where
Figure 6B:
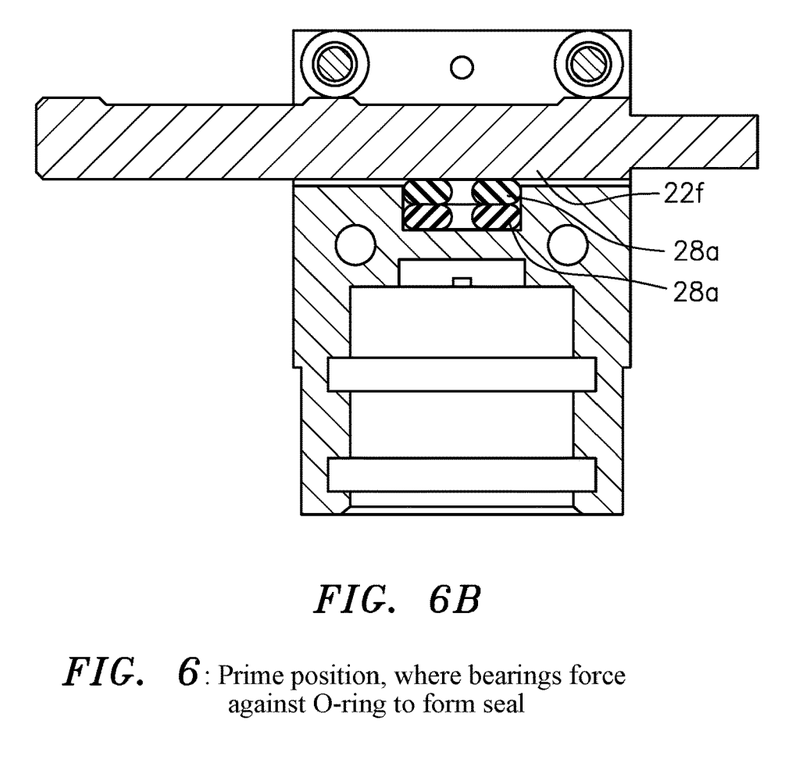
FIG. 6B shows a cross-sectional view of the smart slide in FIG. 6A along section lines C-C.

FIG. 6 includes FIGS. 6A and 6B, e.g., showing the smart slide 20 in the prime/rinse position, where the bearings 24a force the slider 22 against the O-rings 28a, 28b to form a seal between a second part 22f of the slider 22 and the O-rings 28a, 28b.

In operation, the slider 22 is configured to move from the transition position to the rinse position and cause the bearing assembly arrangement 24 to force the second part 22f of the slider 22 to push against the inner channel sealing arrangement 28 as the roller bearings 24a ride up the ramps 22a1, 22a3 to the raised portions 22b1, 22b2 when the slider is moved to the rinse position (see FIG. 6), e.g., consistent with that shown in FIGS. 5-6. The second part 22f of the slider 22 may be configured to seal the inner tube cap channel sealing arrangement 28 when the slider 22 is in the rinse position (see FIG. 6).

FIG. 7

Figures 7A, 7B, 7C, 7D:
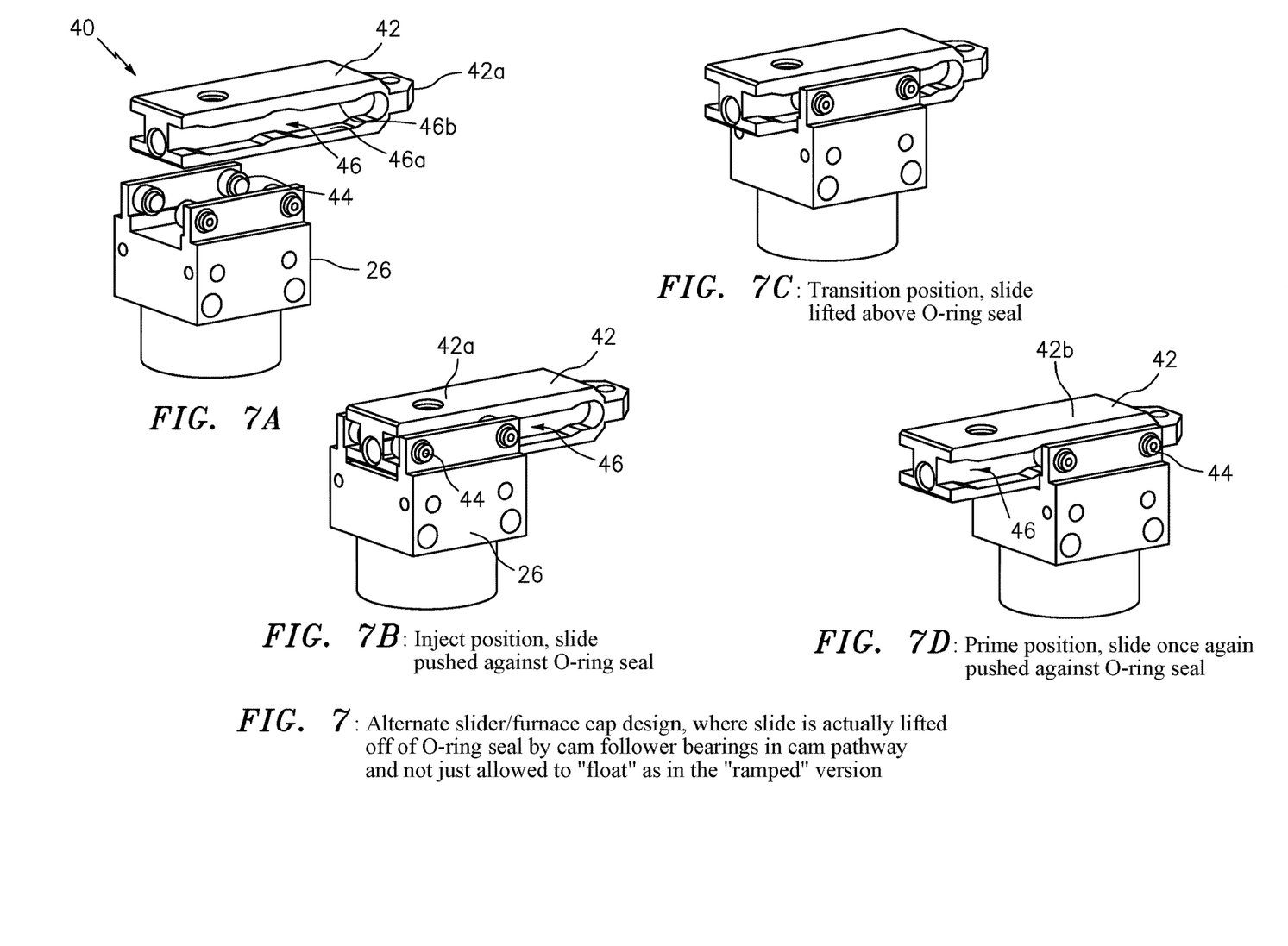
FIG. 7A shows a perspective exploded view of the alternate slider/furnace cap design having the slider exploded away from bearing arrangement portion, where
FIG. 7B shows a perspective view of the alternate slider/furnace cap design in the inject position with a first part of the slider pushed against the O-ring (compare FIGS. 4A, 4B), where
FIG. 7C shows a perspective view of the alternate slider/furnace cap design in the transition position with the slider 42 lifted above the O-ring (compare FIGS. 5A, 5B), and where
FIG. 7D shows a perspective view of the alternate slider/furnace cap design in the prime position with a second part of the slide once again pushed against the O-ring (compare FIGS. 6A, 6B).

FIG. 7 includes FIGS. 7A thru 7D that show an alternate slider/furnace cap design generally indicated as 40 having a slider 42 with a slide injector 42a, cam follower bearings 44 and a cam pathway generally indicated by 46, e.g., such that the slider 42 is actually lifted off of the O-ring seal by the cam follower bearings 44 in the cam pathway 46 and not just allowed to "float" as in the "ramped" version (e.g., see and compare FIGS. 4A, 4B; 5A, 5B; and 6A, 6B). In effect, the lower surface 46a of the cam pathway 46 is configured similar to the cam-like contoured surface 22a (see FIGS. 2A, 2B and 4-6). In contrast, the cam pathway 46 includes an upper surface 46b having an inverted/opposite contour when compared to the lower surface 46a, e.g., having associated (i.e. lower) surfaces corresponding to associate raised surfaces of the lower surface 46a of the cam pathway 46, having associated raised intermediate surfaces corresponding to the lower intermediate surfaces of the lower surface 46a of the cam pathway 46, and having associated ramps corresponding to the ramps of the lower surface 46a, e.g., for coupling the associated (i.e. lower) surfaces and the associated raised intermediate surfaces.

In effect, the alternate slider/furnace cap design 40 operates similarly to the slider/furnace design 20, as follows:

For example, FIG. 7B shows the alternate slider/furnace cap design 40 in the inject position with a first part 42b of the slider 42 pushed against the O-ring (compare FIGS. 4A, 4B).

FIG. 7C shows the alternate slider/furnace cap design 40 in the transition position with the slider 42 lifted above the O-ring (compare FIGS. 5A, 5B).

FIG. 7D shows the alternate slider/furnace cap design 40 in the prime/rinse position with a second part 42c of the slider 42 once again pushed against the O-ring (compare FIGS. 6A, 6B).

In effect, the alternate slider/furnace cap design 40 moves from the transition position to the inject position and the rinse position in a manner similar to the slider/furnace cap design 20. For example, compare that shown in FIGS. 4-5 to that shown in FIGS. 7B and 7C, and compare that shown in FIGS. 5-6 to that shown in FIGS. 7C and 7D.

FIG. 8

Figures 8A, 8B:
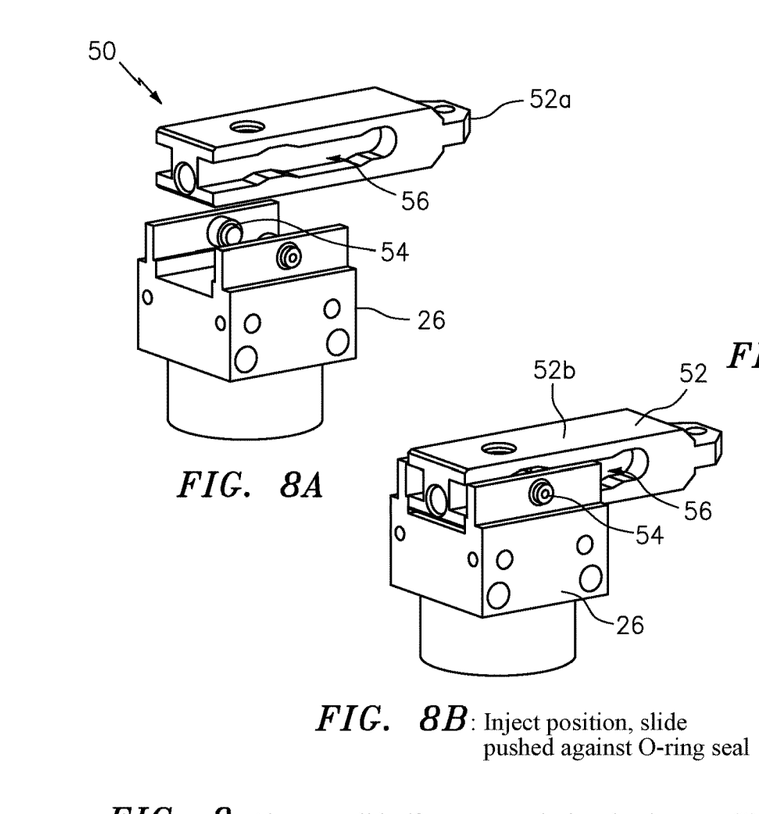
FIG. 8A shows a perspective partial exploded view of the alternate slider/furnace cap design having the slider exploded away from bearing arrangement portion, where
FIG. 8B shows a perspective view of the alternate slider/furnace cap design in the inject position with a first part of the slider pushed against the O-ring (compare FIGS. 4A, 4B and 7B), where
Figures 8C, 8D:
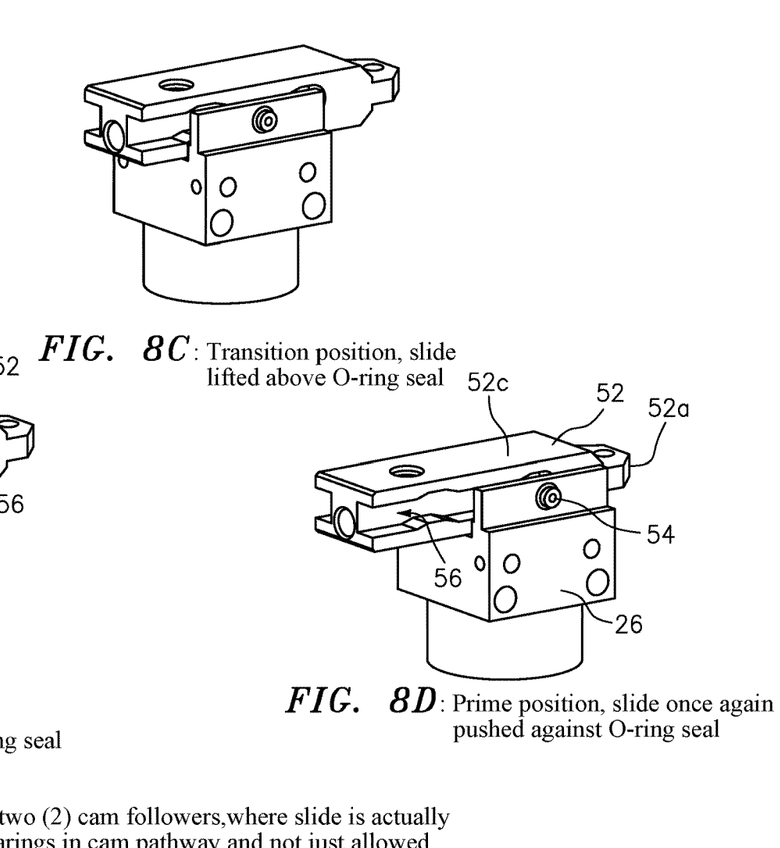
FIG. 8C shows a perspective view of the alternate slider/furnace cap design in the transition position with the slider lifted above the O-ring (compare FIGS. 5A, 5B and 7C), and where
FIG. 8D shows a perspective view of the alternate slider/furnace cap design in the prime position with a second part of the slider once again pushed against the O-ring (compare FIGS. 6A, 6B and 7D). In a still alternative embodiment, the 2 bearing design could also be done in the "ramped" version, e.g., see and compare FIGS. 4A, 4B; 5A, 5B; and 6A, 6B).

FIG. 8 includes FIGS. 8A thru 8D that show an alternate slider/furnace cap design generally indicated as 50 having a slider 52 with a slide injector 52a, and a cam pathway 56 with two (2) cam followers/bearings 54, e.g., such that the slider 52 is actually lifted off of the O-ring seal by the cam follower bearings 54 in the cam pathway 56 and not just allowed to "float" as in the "ramped" version (e.g., see and compare FIGS. 4A, 4B; 5A, 5B; and 6A, 6B). The cam pathway 56 has a substantially similar configuration to the cam pathway 46 (FIG. 7), e.g., including similar lower and upper contoured surfaces.

FIG. 8B shows the alternate slider/furnace cap design 50 in the inject position with a first part 52b of the slider 52 pushed against the O-ring (compare FIGS. 4A, 4B and 7B).

FIG. 8C shows the alternate slider/furnace cap design 50 in the transition position with the slider 52 lifted above the O-ring (compare FIGS. 5A, 5B and 7C).

FIG. 8D shows the alternate slider/furnace cap design 50 in the prime/rinse position with a second part 52c of the slider 52 once again pushed against the O-ring (compare FIGS. 6A, 6B and 7D).

Alternative Embodiment

In a still alternative embodiment, the 2-bearing design in FIG. 8 could also be done in the "ramped" version, e.g., see and compare FIGS. 4A, 4B; 5A, 5B; and 6A, 6B). In this embodiment, corresponding raised surfaces would be configured to provide sealing action in relation to the inner tube cap channel sealing arrangement (see FIGS. 4B, 5B, 6B, O-rings 28a, 28b) when the slider 22 is in either the inject position (FIG. 2A, 3A, 4A, 4B) or the rinse position (FIG. 3B, 6A, 6B).

Double Hammer Design

An alternate version of the present invention may include a double hammer-like design, where each "hammer" would alternate between forming a seal on the top of the furnace, e.g., with one hammer serving as the Inject/Waste port, and the other hammer serving to provide the carrier gas port. This would likely provide the increased O-ring life, but at the expense of cost and complexity and a significant loss of sealing while the hammers are alternating.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A furnace system comprising:
a sliding style furnace cap having a furnace tube cap and a slider;
the furnace tube cap having a first cap portion configured to couple to a furnace tube of a furnace, and having a second cap portion with a bearing assembly arrangement, the furnace tube cap also having an inner tube cap channel passing from the first cap portion to the second cap portion with an inner tube cap channel sealing arrangement configured to extend around the inner tube cap channel; and
the slider having an orifice or channel configured therein passing through the slider, being configured to couple and slide in the bearing assembly arrangement from an inject position to a rinse position, and vice versa, having a contoured surface with a first ramp configured to couple a first raised surface and an intermediate lower surface, and with a second ramp configured to couple the intermediate lower surface to a second raised surface,
the slider configured to move towards the inner tube cap channel and cause the bearing assembly arrangement to force a bottom part of the slider to push against the inner tube cap channel sealing arrangement as a corresponding part of the bearing assembly arrangement rides up either the first ramp to the first raised surface when the slider is moved to the inject position, or the second ramp to the second raised surface when the slider is moved to the rinse position, and to force the bottom part of the slider to seal the inner tube cap channel sealing arrangement when the slider is in either the inject position or the rinse position, and
the slider configured to move away from the inner tube cap channel and cause the bearing assembly arrangement to allow the bottom part of the slider to float above the inner tube cap channel sealing arrangement as the corresponding part of the bearing assembly arrangement rides along the intermediate lower surface when the slider is in transition between the inject position and the rinse position.

2. The furnace system according to claim 1, wherein the inner channel sealing arrangement comprises an O-ring combination, including an inner elastomeric seal with an inner O-ring made of Viton and an outer inert and self-lubricating O-ring made of Teflon.

3. The furnace system according to claim 1, wherein the contoured surface includes:
the first ramp configured to couple the first raised surface and a first intermediate lower surface,
the second ramp configured to couple the first intermediate lower surface to the second raised surface,
a third ramp configured to couple the second raised surface to a second intermediate lower surface, and
a fourth ramp configured to couple the second intermediate lower surface to a third raised surface.

4. The furnace system according to claim 1, wherein the bearing assembly arrangement comprises two sets of bearing assemblies, a first set of bearing assemblies configured or arranged over the first raised surface in the inject position, and a second set of bearing assemblies configured or arranged over the second raised surface in the rinse position.

5. The furnace system according to claim 1, wherein the slider comprises:
a cam pathway having an upper contoured surface and a corresponding lower contoured surface; and
the bearing assembly arrangement comprises a bearing cam follower.

6. The furnace system according to claim 5, wherein the slider comprises:
a first cam pathway having first upper and lower contoured surfaces;
a second cam pathway having second upper and lower contoured surfaces; and
the bearing assembly arrangement includes two bearing cam followers.

7. The furnace system according to claim 1, wherein the furnace system is a Total Organic Carbon (TOC) system for measuring organic contaminants in a water system.

8. A sliding style furnace cap, comprising:
a furnace tube cap having a first cap portion configured to couple to a furnace tube of a furnace, and having a second cap portion with a bearing assembly arrangement, the furnace tube cap also having an inner tube cap channel passing from the first cap portion to the second cap portion with an inner tube cap channel sealing arrangement configured to extend around the inner tube cap channel; and
a slider having an orifice or channel configured therein passing through the slider, being configured to couple and slide in the bearing assembly arrangement from an inject position to a rinse position, and vice versa, having a contoured surface with a first ramp configured to couple a first raised surface and an intermediate lower surface, and with a second ramp configured to couple the intermediate lower surface to a second raised surface,
the slider configured to move towards the inner tube cap channel and cause the bearing assembly arrangement to force a bottom part of the slider to push against the inner tube cap channel sealing arrangement as a corresponding part of the bearing assembly arrangement rides up either the first ramp to the first raised surface when the slider is moved to the inject position, or the second ramp to the second raised surface when the slider is moved to the rinse position, and to force the bottom part of the slider to seal the inner tube cap channel sealing arrangement when the slider is in either the inject position or the rinse position,
the slider configured to move away from the inner tube cap channel and cause the bearing assembly arrangement to allow the bottom part of the slider to float above the inner tube cap channel sealing arrangement as the corresponding part of the bearing assembly arrangement rides along the intermediate lower surface when the slider is in transition between the inject position and the rinse position.

9. The sliding style furnace cap according to claim 8, wherein the inner channel sealing arrangement comprises an O-ring combination, including an inner elastomeric seal with an inner O-ring made of Viton and an outer inert and self-lubricating O-ring made of Teflon.

10. The sliding style furnace cap according to claim 8, wherein the contoured surface includes:
the first ramp configured to couple the first raised surface and a first intermediate lower surface,
the second ramp configured to couple the first intermediate lower surface to the second raised surface,
a third ramp configured to couple the second raised surface to a second intermediate lower surface, and
a fourth ramp configured to couple the second intermediate lower surface to a third raised surface.

11. The sliding style furnace cap according to claim 8, wherein the bearing assembly arrangement comprises two sets of bearing assemblies, a first set of bearing assemblies configured or arranged over the first raised surface in the inject position, and a second set of bearing assemblies configured or arranged over the second raised surface in the rinse position.

12. The sliding style furnace cap according to claim 8, wherein the slider comprises:
a cam pathway having an upper contoured surface and a corresponding lower contoured surface: and
the bearing assembly arrangement comprises a bearing cam follower.

13. The sliding style furnace cap according to claim 12, wherein the slider comprises:
a first cam pathway having first upper and lower contoured surfaces;
a second cam pathway having second upper and lower contoured surfaces; and
the bearing assembly arrangement includes two bearing cam followers.

* * * * *